United States Patent [19]

Kimura et al.

[11] Patent Number: 4,953,102
[45] Date of Patent: Aug. 28, 1990

[54] METHOD FOR PRODUCING CHARACTER PATTERNS

[75] Inventors: Shigeki Kimura, Ibaraki; Kouichi Shibata, Osaka, both of Japan

[73] Assignee: Mita Industrial Co., Ltd., Osaka, Japan

[21] Appl. No.: 844,433

[22] Filed: Mar. 26, 1986

[30] Foreign Application Priority Data

Mar. 30, 1985 [JP] Japan ................................. 60-68077
May 31, 1985 [JP] Japan ................................ 60-119290

[51] Int. Cl.$^5$ ......................................... G01D 15/06
[52] U.S. Cl. .................................. 364/518; 364/521; 340/724; 340/750
[58] Field of Search .............. 364/518, 519; 340/724, 340/750, 748, 799, 798, 747; 400/121; 328/72

[56] References Cited

U.S. PATENT DOCUMENTS

| | | | |
|---|---|---|---|
| 3,298,013 | 1/1967 | Koster | 340/750 |
| 4,345,245 | 8/1982 | Vella et al. | 340/744 |
| 4,377,333 | 3/1983 | Tsuji et al. | 355/3 SH |
| 4,426,645 | 1/1984 | Sakai et al. | 340/724 |
| 4,468,141 | 8/1984 | Rosza | 400/124 |
| 4,590,585 | 5/1986 | Cummings et al. | 364/518 |
| 4,622,546 | 11/1986 | Sfarti et al. | 340/748 |
| 4,642,622 | 2/1987 | Ito et al. | 340/724 |
| 4,674,895 | 6/1987 | Tanaka et al. | 364/518 |
| 4,680,578 | 7/1987 | Hornig et al. | 340/731 |
| 4,694,405 | 9/1987 | Bradbury et al. | 364/518 |
| 4,713,623 | 12/1987 | Mower et al. | 328/72 |

FOREIGN PATENT DOCUMENTS

| | | | |
|---|---|---|---|
| 0144016 | 6/1985 | European Pat. Off. | 400/121 |
| 1504607 | 3/1978 | Fed. Rep. of Germany | 100/121 |
| 573988 | 6/1976 | Japan . | |
| 0128866 | 8/1983 | Japan | 400/121 |

OTHER PUBLICATIONS

Finley et al., "Control of the IBM 3800 Printing Subsystem", IBM Disclosure, Jan., 1978, pp. 2–12.
Control of the IBM 3800 Printing Subsystem (Form IBM J. Res. Develop.), vol. 22, No. 1.

Primary Examiner—Gary V. Harkcom
Assistant Examiner—Phu K. Nguyen
Attorney, Agent, or Firm—Antonelli, Terry, Stout & Kraus

[57] ABSTRACT

A method for producing character patterns by planting a bit pattern of a specified character into a bit map memory. The character-bit pattern corresponding to each specified character is read out of a storage region in a font memory. The storage region is composed of a plurality of regions each of which stores the smallest possible character-bits for the individual pattern to be planted.

5 Claims, 10 Drawing Sheets

METHOD FOR PRODUCING CHARACTER PATTERNS

BACKGROUND OF THE INVENTION

The present invention relates to a method for producing character-bit patterns to be printed in a dot matrix form.

Figure 17:
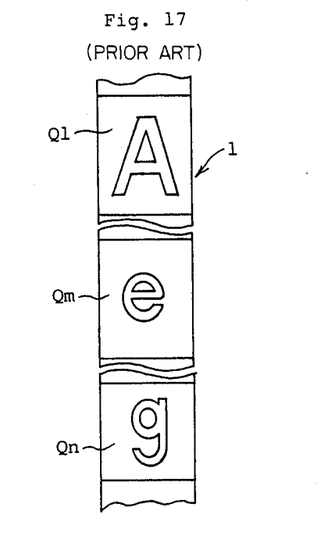
FIG. 17 fragmentarily shows storage regions of a font ROM according to the prior art.
Figure 18:
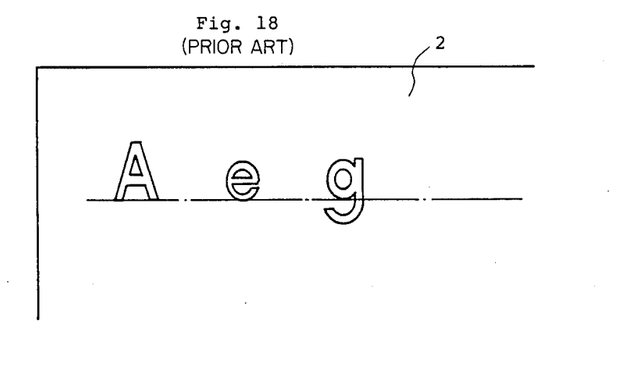
FIG. 18 illustrates how character-bit patterns are planted in the bit map memory using the prior art ROM.

FIG. 17 shows storage regions in a conventional font memory for storing character-bit patterns. The reference numeral 1 indicates a font memory. FIG. 18 illustrates how the character-bit patterns stored in the font memory 1 are planted in a bit map memory indicated by the reference numeral 2. The font memory 1 includes a plurality of storage regions Q1, ..., Qm, ..., Qn, ... (hereinafter to be generally referred to by the reference character Q), each corresponding to an address which is related to a character to be planted. In each storage region Q, there is stored a bit pattern for a character to be planted. The memory-capacities of the storage regions Q are the same, and the capacity is not less than that required for a character-bit pattern whose number of bits is the greatest of all the character-bit patterns.

In a conventional font memory, for example as depicted in FIG. 17, the bit pattern for the character or letter 37 A" is stored in the storage region Q1, and the bit pattern for the character "e" is stored in the storage region Qm. Likewise, the bit pattern of the character "g" is stored in the storage region Qn. When the character 37 A" is specified to be planted, a corresponding address designates the storage region Q1, and the whole of storage region Q1 is read or scanned to plant the bit pattern for the letter 37 A" on the bit map memory as in FIG. 18. In the same way, when the characters "e" and "g" are specified, corresponding addresses designate storage regions Qm and Qn, respectively. Then the whole of storage regions Qm and Qn are scanned and, as a result, the bit patterns for the characters "e" and "g" are planted in the bit map memory as illustrated in FIG. 18.

In the font memory 1 according to the above prior art, each storage region is designed to have a memory-capacity which is not less than the memory-capacity required to store a bit pattern for the character having the greatest number of bits of all the characters. Accordingly, the font memory 1 leaves a wasted blank area where no bit pattern is stored, resulting in a poor utilization of the font memory.

An object of the invention is to improve the utilization of a font memory by making sure that, in storage regions of a font memory for storing character-bit patterns, a blank with no character-bit is not produced outside the character-bit pattern at least in the direction perpendicular to the direction of scanning of the character-bit pattern.

Another object of the invention is to reduce the scanning time required to plant a character-bit pattern in the bit map memory.

Still another object of the invention is to improve the utilization of a font memory by further reducing to a minimum the wasted blank area in a storage region used for storing the bit pattern of the character.

SUMMARY OF THE INVENTION

The present invention is essentially directed to a method for producing character patterns which comprises a step of providing a font memory having a plurality of storage regions for storing bit patterns of characters, a step of providing a bit map memory for storing the bit pattern at position where the bit patterns are to be outputted, and a step of planting the bit pattern from the font memory in the bit map memory.

According to the present invention, the following advantageous improvements are provided:

The storage region in the font memory includes a character pattern section which corresponds to an individual character to be planted and which has the character-bit pattern stored therein over the width occupied by the character-bit pattern at least in the direction perpendicular to the direction of scanning of the character-bit pattern.

Planting of the character-bit pattern in the bit map memory is done by scanning the bit map memory the number of times or cycles equal to a total number of scanning lines b, starting at a position preceding, by a number of scanning lines a, a predetermined imaginary line (hereinafter referred to as the "base line") which extends in the direction of scanning and is common to all bit patterns. The number of scanning lines a is equal to the number of lines which are to be scanned in the portion of the area to be scanned prior to the base line over the area occupied by the bit pattern.

Planting of the character-bit pattern in the bit map memory may suitably be done by setting a letter pitch c which determines the position for planting the next character displaced in the direction of scanning. The pitch setting may be done after the scanning is carried out the number of times b starting at the position before the base line by an amount equal to the number of scanning lines a.

Planting of the character-bit pattern in the bit map memory may suitably be done by scanning the storage region of the font memory b times or cycles, starting at a position preceding the base line by an amount equal to the number of the scanning lines a over a width d along each scanning line. The width d is a width along a scanning line occupied by the character-bits when the character-bit pattern is projected onto the scanning line, plus a predetermined additional width (hereinafter to be referred to as "maximum scanning width d").

Planting of the character-bit pattern may also suitably be done by scanning the font memory b times or cycles over the maximum scanning width d starting at a position preceding the base line by an amount equal to the number of scanning lines a, and then setting the letter pitch c.

Tha maximum scanning width d may suitably be just equal to the width along the scanning line occupied by the character-bit when the character-bit pattern is projected on the scanning line.

The data indicative of the scanning lines a and b, and/or the letter pitch c, and/or the maximum scanning width d may suitably be stored, together with the bit pattern of the character to be outputted, in the storage region of the font memory where the bit pattern of the character is stored.

Alternatively, the data indicative of the scanning lines a and b, and/or the letter pitch c, and/or the maximum scanning width d may suitably be stored, together with addresses specifying the storage regions of the font memory, in a code converting table which is provided independently of the font memory. Further, the scanning for the planting of the character-bit pattern may suitably be carried out by reading out from the code conversion table the address of the font memory, the number of scanning lines a and b, and/or the letter pitch c, and/or the maximum scanning width d, based on the code signal corresponding to the character to be planted.

In accordance with the invention, as briefly described hereinabove, the number of scanning lines a, which determines the position preceding the base line from which the scanning starts, is equal to the number of scanning lines which scan the portion of the font memory in the area scanned prior to the base line over the area occupied by the bit pattern. As a result, in the storage area of the font memory, no blank which is not occupied by the character-bits exists in the area which is outside the character-bit pattern, at least in a direction perpendicular to the scanning direction.

Moreover, in accordance with the invention, it is possible to adjust the letter pitch c between characters to be successively planted in the bit map memory, and/or to institute the maximum scanning width d in the direction of scanning of the bit pattern for individual characters. Thus, the scanning time required to plant bit patterns in the bit map memory is greatly reduced.

The present invention substantially relates to a method for producing character patterns which comprises a step of providing a font memory having a plurality of storage regions for storing bit patterns of characters, a step of providing a bit map memory for storing the bit patterns at positions where the bit patterns are to be outputted bit map the font memory, and a step of planting the bit pattern from the font memory in the bit map memory, wherein further advantageous improvements are provided:

The storage region of the font memory may suitably comprises a character pattern section which corresponds to an individual character and includes a chain of unit storage sections. Each unit storage section has an identical bit capacity. The character-bits are stored or piled up in the character pattern section by every unit storage sections. The character-bits are stored or piled up in the character pattern section by filling every unit storage sections with character-bits until the scanned width reaches a number of bits equal to the capacity of the unit storage section, when the character-bit patterns planted in the bit map memory are successively scanned.

Planting of the bit pattern in the bit map memory may suitably be done by carrying out the scanning the number of times or cycles p which is equal to the total number of scanning lines for scanning of the character-bit pattern, starting at a scan start-up point of coordinates (r, s) and having a maximum scanning width q.

The data of scanning lines p and the maximum scanning width q, and the point (r, s) may be stored, together with the bit pattern of the character to be outputted, in the storage region of the font memory which stores the charactor-bit pattern.

Alternatively, the data of the scanning lines p, the maximum scanning width q, and the coordinates (r, s) may suitably be stored, together with the address corresponding to the storage region of the font memory where the bit pattern of the character is stored, in a code conversion table provided independently of the font memory. The scanning operation for planting the character pattern may be conducted by reading out of the conversion table the address of the font memory, the scanning lines p, the maximum scanning width q and the coordinates (r, s), based on a code signal corresponding to each character to be planted.

In accordance with the invention, the character-bit pattern is stored in the chain of unit storage sections of a storage region which corresponds to an individual character. Thus, it is possible to reduce the number of bits present in the wasted blank area of the storage region in the font memory to a value less than that equal to the storage capacity of a unit storage section. This desirably results in brings further improved utilization of the font memory. Moreover, according to the invention, it is also possible to maintain the maximum scanning width q in the direction of bit pattern scanning direction, and the number of scanning lines p in a direction perpendicular to the bit pattern scanning direction both at a possible minimum in relation to each character to be planted. This, in turn, results in reduction of the scanning time required to plant the bit pattern in the bit map memory.

These and other objects of the present invention will be apparent from the detailed description hereinafter with reference to the accompanying drawings.

DETAILED DESCRIPTION OF THE PREFERED EMBODIMENTS

Figure 1:
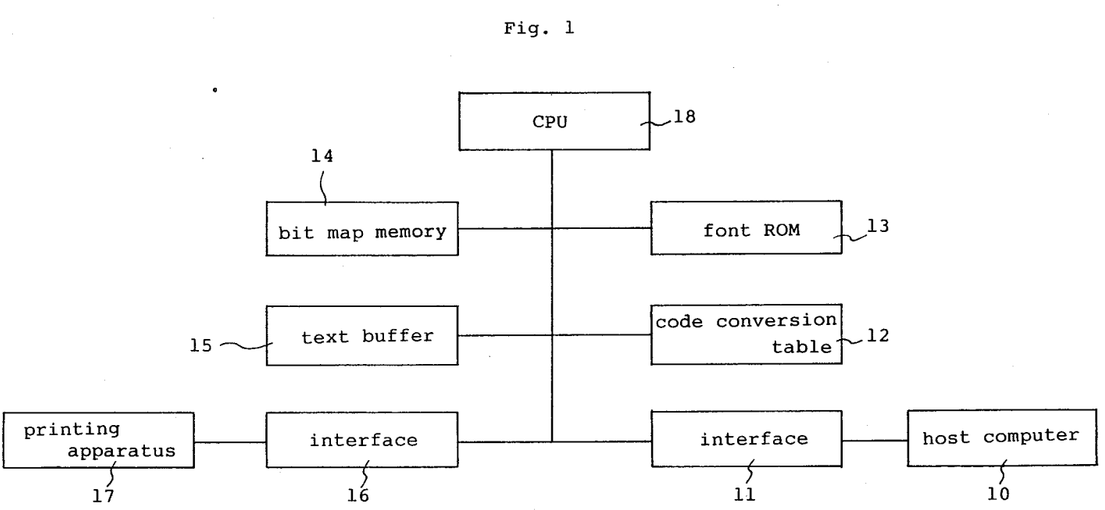
FIG. 1 is a block diagram illustrating a preferred embodiment of the invention.

FIG. 1 illustrates a block diagram which shows one preferred embodiment of the present invention for implementing a method of generating character patterns. Character-code signals produced in a host computer 10 are fed through an interface 11 to a text buffer 15 to be stored therein. The character-code signals stored in the text buffer 15 are then read out by a central processing unit (CPU) 18 and are fed to a code conversion table 12. As shown in Table 1 below, font addresses are written in the code conversion table 12, each address corresponding to one character-code. For example, the character code "1" corresponds to the font address F1 wherein a bit pattern for the alphabetical letter A is stored.

TABLE 1

| Character Codes | F |
|---|---|
| 1 | F 1 |
| 2 | F 2 |
| 3 | F 3 |
| — | — |
| m | Fm |
| — | — |
| n | Fn |
| — | — |

When a character-code signal is fed into the code conversion table 12, a font address corresponding to the incoming character-code signal is read out from the code conversion table 12. Then, the stored content of the font read-only memory (ROM) 13 which corresponds to the given address is read out to be fed into a bit map memory 14.

In the bit map memory 14, a horizontal scanning of the stored content in the font ROM 13 is carried out in order to plant the desired character-bit pattern which has been stored in the font ROM 13. A plurality of character-bit patterns stored in the font ROM 13 are read out character by character in accordance with each character code signal, and as result, just one frame of the character-bit patterns is planted in the bit map memory 14. The bit patterns thus planted in the bit map memory 14 are inputted via an interface 16 into a printing apparatus 17 for the desired printing operation.

It should be noted that the interface 11, the code conversion table 12, the font ROM 13, the bit map memory 14, the text buffer 15, and the interface 16 are all under the control of command signals from the CPU 18.

Figure 2:
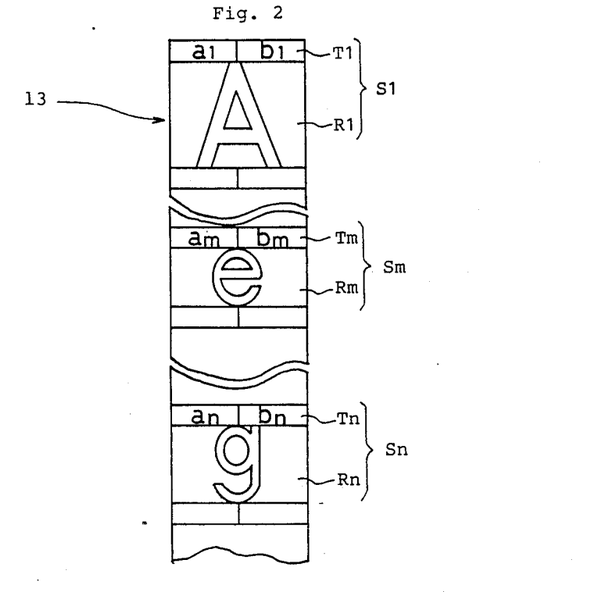
FIG. 2 fragmentally shows storage regions of a font ROMs (read-only memory) used in the preferred embodiment of the invention.
Figure 3:
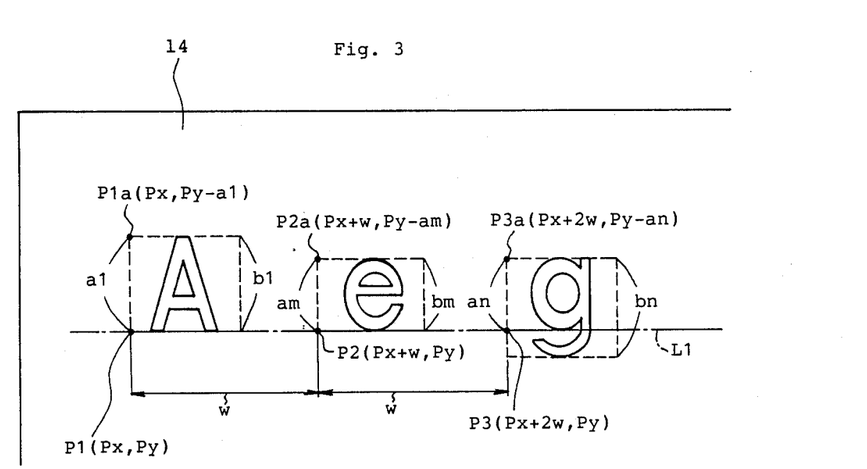
FIG. 3 illustrates how bit patterns of characters are planted in a bit map memory using the font ROM shown in FIG. 2.

FIG. 2 illustrates a storage region of the font ROM 13, while FIG. 3 schematically illustrates how character-bit patterns stored in the font ROM 13 are planted into the bit map memory 14. The font ROM 13 includes a plurality of storage regions S1, ..., Sm, ..., Sn, ... each of which corresponds to an individual letter or character (hereinafter the stored regions are indicated by the alphabetical letter S when referred to in general or as a whole). There are included in the storage regions or areas S, a plurality of character pattern sections R1, ..., Rm, ..., Rn, ... (hereinafter to be generally referred to by the alphabetical letter R) and a plurality of character pattern control sections T1, ..., Tm, ..., Tn, ... (hereinafter generally referred to by the alphabetical letter T) which are disposed in proximity to the above-mentioned character pattern sections R. Each character pattern control section T stores data information which indicates, for example, the size of the given character-bit pattern, and the like. In the character pattern control section T, there are stored data a1, ..., am, ..., an, ... (to be generally indicated hereinafter by reference "a") and the data b1, ..., bm, ..., bn, ... (to be generally indicated hereinafter by reference "b") each of which corresponds to an individual character pattern. The data "a" show the number of scanning lines, indicating the vertical portion or length of a part of the given character pattern which exists in a limited area to be scanned prior to a predetermined, imaginary reference line or base line "L1" which extends in the direction of horizontal scanning and is common to all character patterns. While, on the other hand, the data "b" are indicative of the total number of scanning lines required to scan the character pattern. In the character pattern section R, a bit pattern for an individual character is stored in a form of the dot matrix-like composition or formation, and there exists no area or portion which is scanned prior or subsequent in time to the portion where the character-bit or pattern is present. In other words, the number of bits making up the width of each character pattern section R in a vertical direction is equal to the total number of scanning lines "b" of the character-bit pattern, with the result that there is absolutely no wasteful blank area in the vertical direction.

Now the procedure for planting bit patterns for individual characters in the bit map memory 14 though the operation of the font ROM 13 is described in detail. In the following description, it is assumed that the bit pattern for the alphabetical letter 37 A" is stored in the storage region S1 of the font ROM 13 which corresponds to the font address "F1", that the bit pattern for the alphabetical letter "e" is stored in the storage region Sm which corresponds to the font address "Fm", and that the bit pattern for the alphabetical letter "g" is stored in the storage region Sn which corresponds to the font address "Fn." When the host computer 10 provides a character code signal indicating the "1" code, the code signal is converted into a font address "F1" by the code conversion table 12, and then the storage region S1 in the font ROM 13 is read out according to the given font address. That is to say, the data a1, b1 and the character 37 A" are read out.

Upon this read-out, horizontal scanning is initiated in the bit map memory 14, starting at the scanning start-up position or point P1a (Px, Py-a1) which is displaced upward by the data "a1" away from the coordinates (Px, Py) of a predetermined reference point P1 on the base line L1. This horizontal scanning is carried out over a specific width equal to the horizontal scanning width in the font memory. Upon the completion of the first scanning cycle, subsequent similar scanning cycles are performed by shifting the scanning start-up position in each cycle, until a number of scanning cycles are carried out which is equal to the number of scanning lines b1 which, in turn, corresponds to the vertical width occupied by the character. As the result of the above procedure, the bit pattern for the alphabetical letter 37 A" is planted in the bit map memory 14 as shown in FIG. 3.

When the second character code signal indicating the code "m" is fed from the host computer 10 through the interface 11 into the code conversion table 12, the font address "Fm" is specified, which reads out the storage region Sm of the font ROM 13. That is to say, the data am, bm and the bit pattern for the letter "e" are called out. Thereafter, horizontal scanning is started in the bit map memory 14 at a scanning start-up position P2a (Px+W, Py−am) which is displaced upward by the data "am" from a new reference point P2 (Px+W, Py). The new reference point P2 is on the abovedescribed base line L1 and is shifted rightward by the predetermined amount W from the reference point P1 (Px, Py), the displacement amount W being equal to the letter pitch. The horizontal scanning is repeated for the number of cycles which is equal to the number of vertical scanning lines bm. Upon the completion of the whole scanning operation, the alphabetical letter "e" is planted in the bit map memory 14 as illustrated in FIG. 3.

Likewise, when the character code signal indicative of the code "n" is produced by the host computer 10, the font address "Fn" is specified, and, as a result, the storage region Sn in the font ROM 13 is read out. More precisely, the data an, bn and the bit pattern for the letter "g" are called out, upon which another horizontal scan starts at a start-up point P3a (Px+2W, Py-an) which is displaced upward by the data "an" from a reference point P3 (Px+2W, Py) which, in turn, is shifted from the above-mentioned reference point P2 by the amount W on the reference line L1. The horizontal scanning is repeated for the number of cycles equal to the number of vertical scanning lines bn. When the scanning operation is completed, the bit pattern for the letter "g" is planted in the bit map memory 14 as illustrated in FIG. 3.

Other bit patterns for the remaining characters in the font ROM 13 are successively inprinted in the bit map memory 14 in the similar manner as described above until one frame of character-bit patterns is planted in the memory 14. The data information stored in the bit map memory 14 and indicative of one frame of character bit patterns is then supplied via the interface 16 into the printing apparatus 17 in order to print out the desired characters.

As is clear from the above description, in the font ROM 13 for producing the character-bit patterns according to the invention, there exists no wasted blank area, at least in the vertical direction, as is usually found in conventional font memory devices. Thanks to the absence of such wasteful blank area, the utilization of the font ROM 13 is greatly improved. Moreover, according to the invention, the amount of time required to read out the desired data information from the font memory and to plant the same on the bit map memory is reduced, resulting in high-speed processing.

Figure 4:
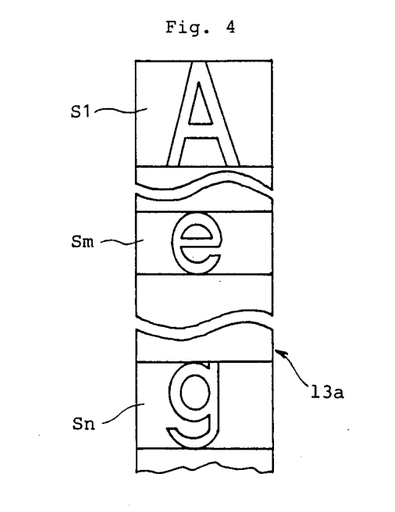
FIG. 4 fragmentally shows storage regions of a font ROM according to another preferred embodiment of the invention.

FIG. 4 illustrates a memory storage region of a font ROM 13a according to another embodiment of the invention. In order to distinguish from component parts in the preceding embodiment, a subscript a is added to the reference numerals in the drawing. For example, the font ROM is designated by reference numeral 13a. In the font ROM 13a, there is provided no character pattern control section T. However, the data "a" and "b" which have been stored in the character control section T in the previous embodiment are stored in a code conversion table 12a according to this embodiment. Therefore, when a character code signal from the host computer indicates the "1" code, the font address "X1" and the data a1, b1 are read out from the code conversion table 12a as shown in Table 2.

TABLE 2

| Character Codes | X | a | b |
|---|---|---|---|
| 1 | X1 | a1 | b1 |
| 2 | X2 | a2 | b2 |
| 3 | X3 | a3 | b3 |
| — | — | — | — |
| m | Xm | am | bm |
| — | — | — | — |
| n | Xn | an | bn |
| — | — | — | — |

Assuming that the character-code signal indicating the code "1" is fed from the host computer 10 into the code conversion table 2a via the interface 11, then the font address "X1" and the data a1, b1 are read out of the code conversion table 12a. Thereafter, the bit pattern for the letter 37 A" stored in the storage region corresponding to the font address "X1" is read out of the font ROM 13a. In the bit map memory 14, the bit pattern for the letter 37 A" is planted based on the data a1, b1 in a similar procedure as explained above and as shown in FIG. 3. If the second character code signal from the host computer indicates the "m" code, then the font address "Xm" and the data am, bm are read out. As a result, the bit pattern for the letter "e" which is stored in the storage region Sm of the font ROM 13a is called out, and the bit pattern for the letter "e" is planted as shown in FIG. 3 according to the data am, bm and in the similar procedure as described above. When the third character code signal specifies the code "n", the font address "Xn" and the data an, bn are taken out of the code conversion table 12a. Upon this read-out, the bit pattern for the letter "g" stored in the storage region Sn of the font ROM 13a is called out and the bit pattern for the letter "g" is planted as shown in FIG. 3 according to the data an, bn and following the procedure similar to the one explained above.

Figure 5:
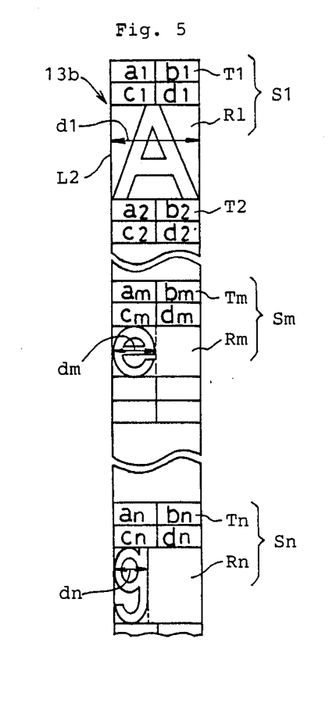
FIGS. 5 and 6 fragmentally show storage regions of font ROMs according to still other embodiments of the invention.

FIG. 5 illustrates the storage regions of a font ROM according to still another preferred embodiment of the invention. In this embodiment, a subscript "b" is added to the reference numerals in order to distinguish from the corresponding parts and elements in the previous embodiments. Stored in the character pattern control section T1 are the data a and b. In addition, the data concerning the letter pitches c1, . . . , cm, . . . , cn, . . . (hereinafter to be generally referred to by the reference "c"), and the data concerning the maximum scanning width d1, . . . , dm, . . . dn, . . . (hereinafter to be generally indicated by the reference "d") are stored in the character pattern control sections T1. The letter pitch data c indicates the displacement of the reference position for planting of the next character when character patterns are successively planted in the bit map memory 14. The, the maximum scanning width d indicates the maximum range which the character bit occupies on the scanning line as measured from the left end reference line L2 of the character when the character-bit pattern is projected on the scanning line. It is essential that the bit width of the storage region S along the horizontal line be greater than any of the maximum scanning widths d of the character-bit patterns, and, for example, the horizontal bit width of the storage region S is made up of 32 bits.

Figure 6:
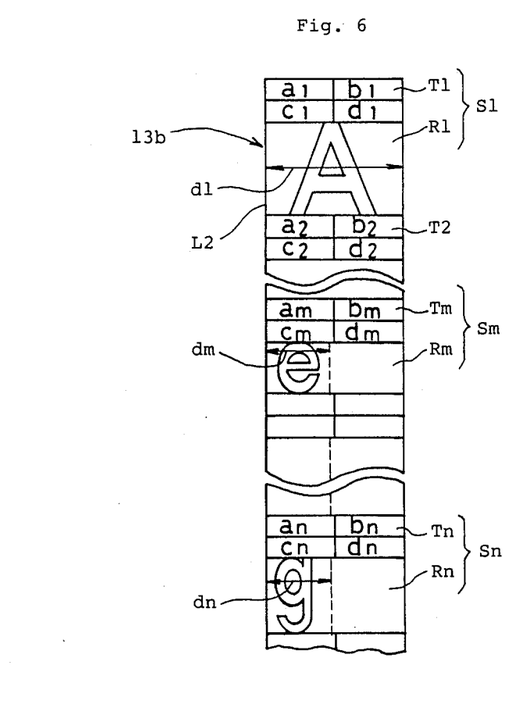

In FIG. 5, the maximum scanning width d is precisely equal to extension of the character-bits in the direction of horizontal scanning. However, as shown in FIG. 6, the maximum scanning width d may be the extension of the character-bits in the direction of the horizontal scanning, plus an additional extension of a predetermined amount, for example, up to several tens of percents of the horizontal bits extension.

It should be noted here that, in the embodiment of the invention which utilizes the font ROM 13b, the code conversion table 12b shown in Table 3 has the construction similar to the code conversion table 12 used in the previous embodiment of FIG. 2 (See Table 1).

TABLE 3

| Character Codes | Y |
|---|---|
| 1 | Y1 |
| 2 | Y2 |

TABLE 3-continued

| Character Codes | Y |
| --- | --- |
| 3 | Y3 |
| — | — |
| m | Ym |
| — | — |
| n | Yn |
| — | — |

Figure 7:
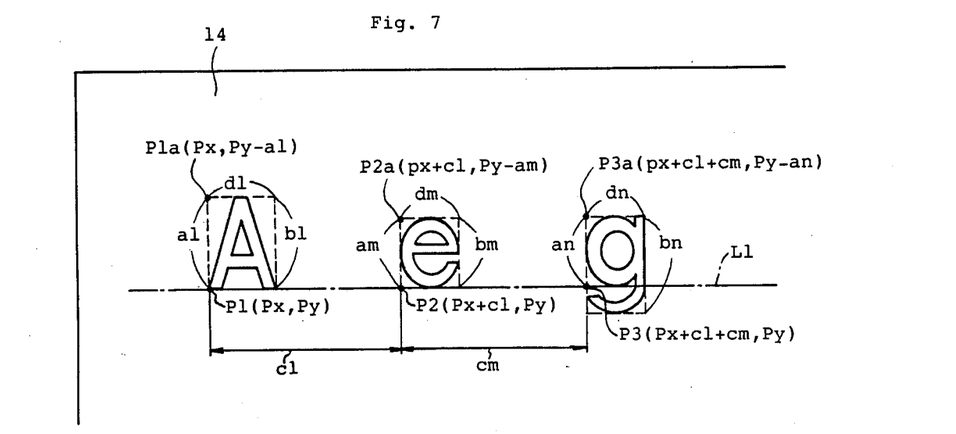
FIG. 7 illustrates how bit patterns of characters are planted in a bit map memory using the font ROM shown in FIG. 5.
Figure 8:
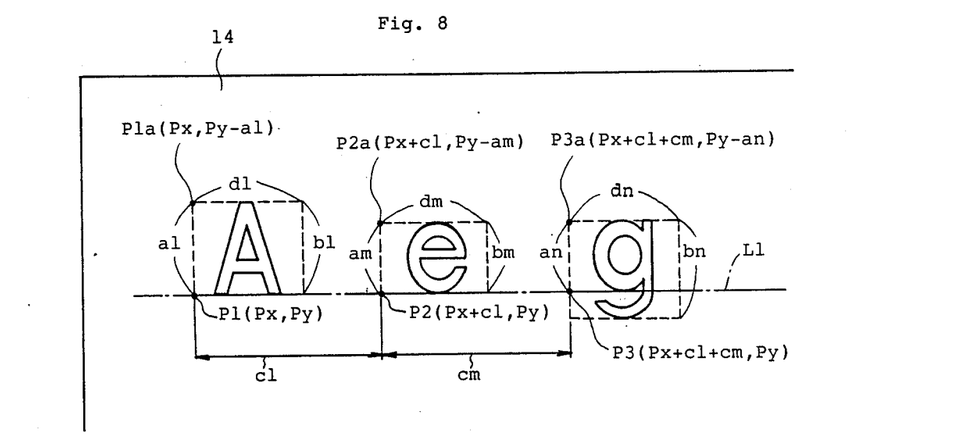
FIG. 8 illustrates how character-bit patterns are planted in a bit map memory utilizing the font ROM shown in FIG. 6.

FIG. 7 schematically illustrates how character-bit patterns are planted in the bit map memory 14 through the operation of the font ROM 13b as shown in FIG. 5, while FIG. 8 schematically illustrates how character-bit patterns are planted in the bit map memory 14 using the font ROM 13b as shown in FIG. 6. Although the maximum scanning width d in the embodiment of FIG. 8 is slightly larger than the maximum scanning width d in the embodiment of FIG. 7, either of them may effectively be employed in the following embodiment.

If the first character code signal produced and supplied by the host computer 10 specifies the code "1", the font address "Y1" is read out in the code conversion table 12b. This results in the read-out of the data a1, b1, c1 and d1 in the font ROM 13b. The first line of the bit pattern for the letter 37 A" is read or scanned from the left-end reference line L2 of the letter over the maximum scanning width d1 in the character pattern region R1. This, in turn, initiates a horizontal scanning cycle in the bit map memory which starts at a start-up position P1a (Px, Pya1) and goes rightward over the bit width d1. As shown, the scanning starting position P1a is displaced from the predetermined reference point P1 (px, Py) on the reference line L1 by the amount equivalent to the number of lines a1. Through this scanning cycle, the portion of the character pattern region R1 scanned by the first scanning line or cycle is planted in the bit map memory 14. Similar horizontal scanning is repeated for b1 cycles or times while lowering longitudinally the scanning level in every cycles, and as a result, the bit pattern for the letter 37 A" is planted in the bit map memory corresponding to the character pattern section R1, as shown in FIG. 7 or FIG. 8.

Where the second character code signal indicates the code "m", the font address "Ym" is read out, which in turn leads to the read-out of the data stored in the storage region Sm in the font ROM 13b. More specifically, the data am, bm, cm and dm are read out. Also, by using the maximum scanning data dm, the first line of the bit pattern for the letter "e" is read from the left-end reference line L2 over the bit width dm in the character pattern section Rm. Through this step, the next reference point P2 is set at a position P2 (Px+c1, Py) which is displaced rightward from the above-mentioned reference point P1 on the reference line L1 by the amount c1. Starting at position P2a (Px+c1, Py-am) shifted upward from the reference point P2 by the amount am, horizontal scanning is carried out in a rightward direction over the bit width dm. A similar horizontal scanning cycle is repeated to scan the whole longitudinal width bm, and upon the completion of the horizontal scanning process, the bit pattern of the letter "e" is planted in the bit map memory at a position displaced rightward by the amount equal to the letter pitch c1.

Where the 3rd character code signal indicates the code "n", the corresponding font address "Yn" is read out from the code conversion table 12b. By this step, the storage region Sn of the font ROM 13b is read which contains the data an, bn, cn and dn. Also, by using the maximum scanning width data dn, the first line of the bit pattern of the letter "g" is read over the bit width dn from the left-end reference line L2 of the letter "g" in the character pattern region Rn. In the bit map memory 14, there is set on the reference line L1 a new reference point P3 (Px+c1+cm, Py) at a position displaced rightward from the aforementioned reference point P2 by the amount equal to the letter pitch cm. The first rightward horizontal scanning cycle starts at a start-up position P3a (Px+C1+cm, Py-an) which is displaced upward away from the reference point P3 by the amount an. A similar scanning cycle is repeated bn times or cycles while downwardly shifting the scanning position. In this way, the bit pattern of the character "g" is planted in the bit map memory 14 at a position displaced rightward from the previously planted bit pattern of the letter "e" by the letter pitch cm.

Similar steps are carried out to plant character-bit patterns corresponding to character code signals until bit patterns sufficient to fill one frame have been planted in the bit map memory 14. Thereafter, the printing apparatus 17 prints out the characters as explained above.

As is clearly understood from the above description, according to this embodiment of the invention, when the character-bit pattern stored in the storage regions of the font ROM 13b is read, the maximum scanning width d of each character bit pattern is also read out. This makes it possible to scan character-bit patterns with the minimum or nearly minimum scanning width for each character with the result that the planting or processing time becomes shorter than that required in the previously explained embodiment.

Figure 9:
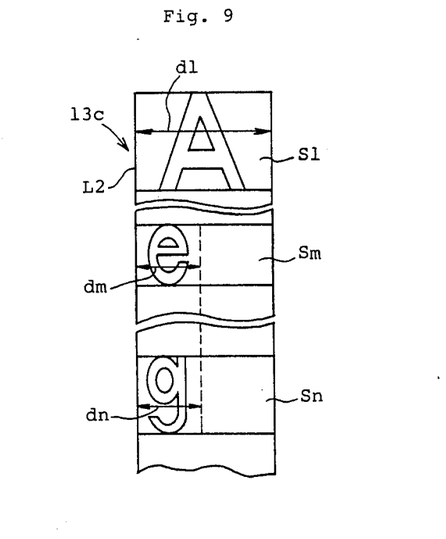
FIGS. 9 and 10 fragmentally show storage regions of font ROMs according to still other preferred embodiments of the invention.

FIG. 9 illustrates the storage regions of a font ROM 13c according to still another embodiment of the invention. In the description, the alphabetical letter "c" is hereafter added to the reference numeral in order to distinguish the present embodiment from the previous ones. However, the font ROM of the embodiment is similar in construction to the font ROM 13b shown in FIG. 6. Therefore, corresponding parts are designated by corresponding reference numerals. In the font ROM 13c, there is provided no character pattern control section T. Instead, the data a, b, c and d as well as the font address "Z" are stored in a code conversion table 12c, as depicted in Table 4.

TABLE 4

| Character Codes | Z | a | b | c | d |
| --- | --- | --- | --- | --- | --- |
| 1 | Z1 | a1 | b1 | c1 | d1 |
| 2 | Z2 | a2 | b2 | c2 | d2 |
| 3 | Z3 | a3 | b3 | c3 | d3 |
| — | — | — | — | — | — |
| m | Zm | am | bm | cm | dm |
| — | — | — | — | — | — |
| n | Zn | an | bn | cn | dn |

If the first character code signal from the host computer indicates the code "1", the font address "Z1" and the data a1, b1, c1 and d1 are read out from the code conversion table 12c. Upon this read-out step, the character-bit pattern is read or scanned from the reference line L2 over the maximum scanning width d1 in the storage region S1 of the font ROM 13c.

Explained more specifically, the bit pattern for the alphabetical letter 37 A" is planted in the bit map memory 14 as shown in FIG. 8, utilizing the data a1, b1, c1 and d1 and following the steps which have been described in connection with the embodiment of FIG. 6. If the second character code signal specifies the code "m", the font address "Zm" and the data am, bm, cm and dm are read out in the code conversion table 12c. Thereafter, in the font ROM 13c, the storage region Sm corresponding to the font address "Zm" is read or scanned from the reference line L2 over the maximum scanning width dm, and the bit pattern for the letter "e" is planted in the bit map memory 14 based on the obtained data am, bm, cm and dm as illustrated in FIG. 8. Likewise, if the third character code signal indicates the code "n", the bit pattern for the letter "g" which is stored in the storage region Sn of the font ROM 13c is planted in the bit map memory as shown in FIG. 8.

Figure 10:
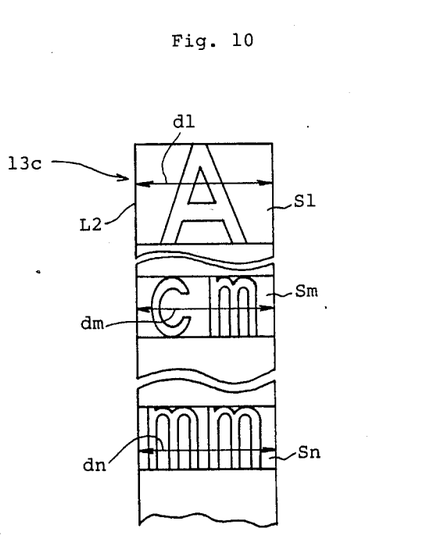

In connection with the font ROM 13c of the aforementioned embodiments, the maximum scanning width dm, dn for example, for the letters stored in the storage regions Sm, Sn are relatively small, leaving blank areas on the right of the character pattern regions Rm and Rn respectively. In order to make an efficient use of the font memory, it is suggested to store in one storage region two characters or letters which are usually used in a pair or in combination such as, for example, as indicated in FIG. 10. In such a case, the two letters are regarded as one inseparable set and, thus, are planted in the bit map memory as they stand. That is to say, the two letters are planted at a time. Of course, it should be noted that the inseparable set may be composed of more than two letters or characters.

As described hereinabove, by storing the data a, b, c and d in the code conversion table 12c instead of keeping them in the font ROM 13c, it is also possible to plant charactor-bit patterns on the bit map memory at a higher speed with a minimum possible scanning width for each character. In addition, by storing the data a, b, c and d in the code conversion table, the storage regions of the font ROM can be reduced in capacity, which in turn results in a more efficient utilization of the font ROM.

Figure 11:
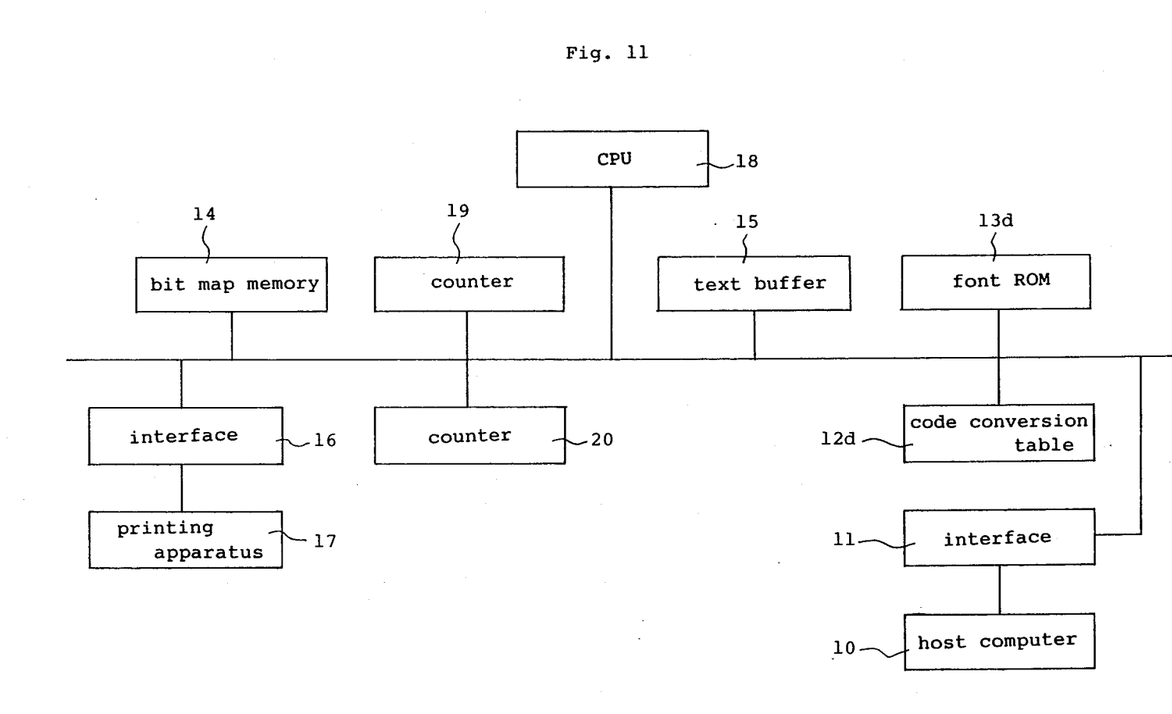
FIG. 11 is a block diagram illustrating another preferred embodiment of the invention.

FIG. 11 is a block diagram which illustrates another embodiment for carrying out the pattern-producing method of the invention. In this embodiment, the alphabetical letter "d" is added to the reference numerals when necessary for the same reason as mentioned above. In a similar manner as explained in connection with FIG. 1, the character code signal from the host computer 10 is fed through the interface 11 into the text buffer 15 to be stored therein. The central processing unit 18 reads out the necessary data information in the text buffer 15 and supplies it to the code conversion table 12d. As shown in Table 5, font addresses are written into the code conversion table 12d, each address corresponding to one character code. For example, the code "1" corresponds to the font address "F1" where a bit pattern of the character 37 A" is stored.

TABLE 5

| Character Codes | F |
| --- | --- |
| 1 | F1 |
| 2 | F2 |
| 3 | F3 |
| — | — |
| m | Fm |
| — | — |
| n | Fn |
| — | — |

When a character code signal is fed into the code conversion table 12d, a font address which corresponds to the incoming character code signal is read out from the table 12d. Then, the stored data in the font ROM 12d that correspond to the given font address is read out and supplied to the bit map memory 14. While at the same time, the counter 19 makes a count of the number of horizontal bits of the character-bit pattern stored in the font ROM 13d, and the counter 20 makes a count of the number of vertical bits in the character-bit pattern.

In the bit map memory 14, horizontal scanning is conducted based on the data stored in the font ROM 13d in order to read out one character-bit pattern that is stored in the font ROM for every character code signal from the host computer. Character-bit patterns are planted in the bit map memory 14 in a number sufficient tc, make up one frame. The bit patterns planted in the bit map memory 14 are then fed through the interface 16 to the printing apparatus 17 to print out the desired characters.

It is pointed out here that the interfaces 11 and 16 the code conversion table 12d, the font ROM 13, the bit map memory 14, the text buffer 15 and the counters 19 and 20 are all under the control of the command signals from the CPU 18.

Figure 12:
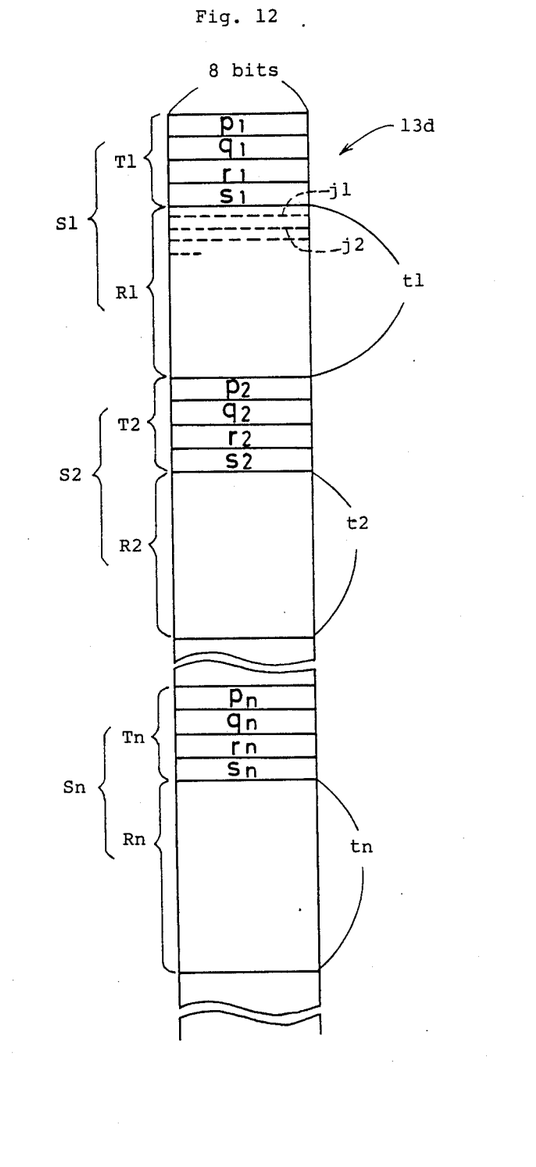
FIG. 12 fragmentally shows storage regions of the font ROM in the embodiment of FIG. 11.
Figure 13:
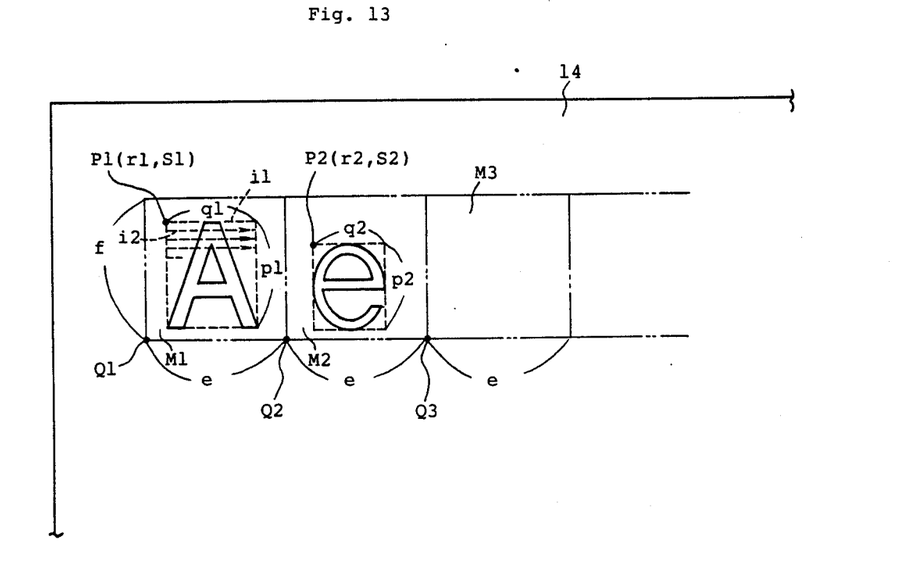
FIG. 13 illustrates how bit patterns are planted in a bit map memory utilizing the font ROM shown in FIG. 12.

FIG. 12 illustrates the storage regions of the font ROM 13d, while FIG. 13 illustrates how the character-bit pattern stored in the font ROM 13d are planted in the bit map memory 14.

The bit map memory 14 includes a plurality of bit sections M1, M2, ... (hereinafter generally indicated by the reference "M") where character-bit patterns are to be planted. The bit sections M have identical bit widths, and each section is made in the form of a matrix with a number of lateral bits e and a number of longitudinal bits f.

There are provided in the font ROM 13d, a plurality of storage regions S1, ..., Sm, ..., Sn, ... (hereinafter to be generally indicated by the reference "S"), each of the storages regions corresponding to one character to be planted. The storage region S includes a plurality of character pattern sections R1, ..., Rm, ..., Rn, ... (to be generally indicated by the reference "R"), and a plurality of character pattern control sections T1, ..., Tm, ..., Tn, ... (to be generally indicated by the reference "T") which are disposed close to the character pattern sections R. In the storage region S, there is stored data concerning a bit pattern of a character to be planted, while in the pattern control section T, there are stored data specifying the position where the character-bit pattern is planted as well as the size of the character-bit pattern. The character pattern section R stores the data about the character-bit pattern. The number of lateral bits is the same for all the character pattern sections R, which is set at 8 bits in the illustrated embodiment. The longitudinal widths t1, t2, ..., tn, ... of the character pattern sections R1, R2, ..., Rn, ... are equal, respectively, to the number of scanning lines of the stored character which is relative to a capacity of character-bits of each character, as will be described later.

Stored in the character pattern control sections T1, T2, ..., Tn, ... are the data indicating the total number of scanning lines p1, p2, ..., pn, ... (hereinafter to be generally shown by the reference "p") for the individual character-bit patterns, and the data indicating the maximum scanning width q1, q2, ..., qn, ... (to be hereinafter generally referred to by the reference "q"). Also stored in the control sections T are the data r1, r2, ..., rn, ... (to be generally indicated by the reference "r") which show x-coordinates of the reference points (to be generally indicated by the reference "r"), and the data s1, s2, . . . , sn, . . . (to be generally indicated by the reference "s") which show y-coordinates of the reference points P1, P2, . . . As is understood from the description made above, the reference points P1, P2, . . . are the scanning start-up positions when the character-bit pattern is to be planted in the bit sections M1, M2, . . . of the bit map memory 14. It is pointed out here that the coordinates (r, s) of the reference point P0 are indicated by regarding the points Q1, Q2, . . . (to be generally shown by the reference "Q") at the lower-left corners of the individual bit sections M as origins (O, O).

Figure 14:
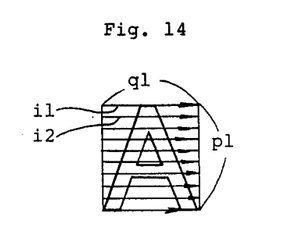
FIGS. 14 and 15 illustrate a manner in which character-bit patterns are stored in the character patterns storage regions.
Figure 15:
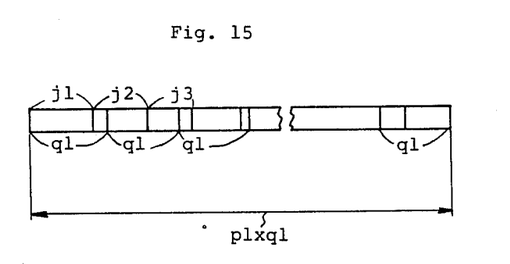

The character-bit pattern is stored beforehand in the character pattern section R. Steps to store the character 37 A" in the character pattern section R1 are now explained. As shown in FIG. 14, the character 37 A" to be planted in the bit map memory 14 might be horizontally scanned by the scanning lines i1, i2, . . . to read out the necessary data. The data thus obtained can be stored in the character pattern storage section R1 on every line or every unit storage section j1, j2, . . . both of which make up a chain of unit storage sections (see dotted lines in FIG. 12). In FIG. 15, the storage units j1, j2, . . . are linearly arranged for the ease of description. The storage units have the identical bit capacity and data storing is to start at the leftmost storage unit j1. The total number of bits in the linearly arranged storage units is equal to p1×q1. On the other hand, the horizontal scanning width of the character pattern section R1 in the font ROM 13d consists of 8 bits. Therefore, the data comprising linearly arranged bits of p1×q1 are actually stored in individual storage units j1, j2, . . . in 8-bit batches, starting at the left end of the character pattern section R1.

For the convenience of description, it is assumed that q1 comprises 13 bits (q1=13). The horizontal scanning through the scanning line i1 reads out 13 bits of information. Of these 13 bits, the first 8 bits are stored in the first storage unit j1 of the character pattern section R1. The remaining 5 bits (13−8=5) read out from the scanning line i1 are added with 3 bits (16−13=3) out of 13 bits stored in the next scanning line i2 so as to make up 8 bits. The 8 bits of information are then stored in the second storage unit j2 the character pattern section R1, starting at the left end thereof. The remaining 10 bits (13−3=10) which will be read out by the scanning line i2 are stored in the third storage unit j3, and so on. More precisely, of the remaining 10 bits, 8 bits are stored in the storage unit j3. The rest (2 bits) are stored in the storage unit j4 together with 6 bits out of 13 bits which will be read out by the third scanning line i3. In this way, all the data comprising p1×q1 bits of information are stored in the character pattern section R1.

Character-bit patterns are stored in other character pattern sections R2, R3, . . . , Rn, . . . in the same manner as explained with respect to the character pattern section R1. The number of bits (p×q) contained in the bit pattern for the character which will be stored in the character pattern section R is expressed by the following equation:

$$8 \times (t-1) < p \times q \leq 8 \times t \quad (1)$$

According to this equation, it is clear that the individual bit pattern is stored in the character pattern section R, only leaving a blank area equivalent to 7 bits at the maximum. This means that there is substantially no wasted blank in the pattern storage section R. It is also pointed out here that the lateral width of the font ROM 13d can be made up of bits other than 8 bits. For example, it can comprise 16 bits.

Figure 16:
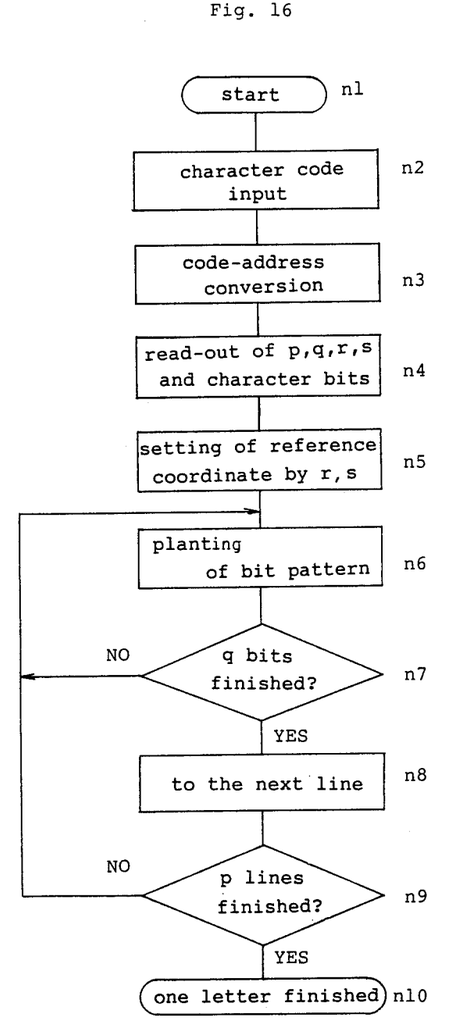
FIG. 16 is a flow chart showing the procedure of planting character-bit patterns in a bit map memory.

FIG. 16 is a flow chart which illustrates various steps for the planting of the character-bit pattern in the bit map memory 14 according to the invention. The following description is made, also referring to FIG. 13 whenever necessary. As the planting operation is started (STEP n1), the host computer 10 provides a character code signal. The code signal is fed through the interface 11 into the text buffer 15 to be stored therein (STEP n2). In STEP n3, code signals sufficient and necessary to plant one character are supplied to the code conversion table 12d which reads out the font address corresponding to the character codes and sends them to the font ROM 13d. In STEP n4, the data p, q, r, s and the character-bit pattern are read out of the font ROM 13d. In STEP n5, the data r and s thus obtained are used to set the reference point P, upon which the counting units 19 and 20 are reset.

In STEP n6, a bit pattern is planted in the bit map memory 14. The horizontal scanning is started at the reference point P(r, s) and the counter unit 19 makes a count of the character-bits which are read out in the character pattern section R. In STEP n7, it is determined whether the horizontal scanning of the whole q bits has been done or not. If it is not finished, then the present procedure goes back to STEP n6. When the horizontal scanning of the whole q bits has been completed, the procedure goes ahead from STEP n7 to STEP n8 wherein the next horizontal scanning is performed. During this scanning cycle, if the bit counter in the counting unit 19 reaches q, then the counter 20 is increased by one. Whenever the counter 20 is increased by one the horizontal scanning proceeds to the next cycle in the bit map memory.

In STEP n9, it is determined whether the horizontal scanning has been repeated p times or cycles. If not, the present procedure goes back to STEP n6. The operation from STEP n6 to STEP n9 is repeated until the horizontal scanning of the q bits has been carried out p times or cycles until the desired character-bit pattern has been planted in the bit map memory 14. Thereafter, the procedure goes on to STEP n10 wherein character-bit patterns sufficient to form one character are planted. The whole course of operation from STEP n1 to STEP n10 is repeated until enough character-bit patterns to make up one frame have been planted in the bit map memory.

Having the aforementioned description of the procedure in mind, the whole method of the invention will now be explained in detail with specific reference to the preferred embodiment of the invention. It is assumed that the bit pattern of the character 37 A" is stored in the storage region S1 of the font ROM 13d (FIG. 12) which corresponds to the font address "F1". When the character-code signal from the host computer 10 indicates the "1" mode, the font address "F1" is specified by the conversion table 12d. According to this address-specification, the storage region S1 of the font ROM 13d is read out to obtain data p1, q1, r1, s1 and bit pattern data for the letter 37 A". Based on the data r1 and s1 thus obtained, the reference point P1 (r1, s1) is set (FIG. 13), and the counting units 19 and 20 are reset. Starting at this reference point P1, horizontal scanning is initiated to read out the character-bit pattern out of the font ROM 13d and to plant it in the bit map memory. In the course of the planting operation, the character-bit pattern is read from character pattern section R1 over the first 8 bits, and this first 8-bit portion of the bit pattern is planted along the first scanning line i1 in the bit section M1. If the 8-bit portion falls short of filling the entire first scanning line i1, the second 8 bits in the storage unit j2 of the storage region R1, and the third 8 bits in the storage unit j3 of the storage region are successively read out. Of the read-out bits, bits equal in number to (q1-8) are planted to be added to the 8 bits already planted along the first scanning line i1. In this way, the portion of the character pattern which corresponds to the q1 bits is planted along the 1st scanning line i1 in the bit region M1. During the planting, the counting unit 19 makes a count of the bits which are being read out of the character pattern section R1. When the bit-count in the counter 19 reaches q1, the count in the other counter 20 is increased by one. Upon this increment, the next horizontal scanning proceeds along the second scanning line i2.

In such a manner, the horizontal scanning over the q1-bit portion is sequentially repeated p1 times or cycles in order to plant the whole bit pattern contained in the character pattern section R1 in the bit map memory 14, and, as a result, the character 37 A" is planted in the bit section M1 of the bit map memory 14, as shown in FIG. 13. When the whole character has been planted, the original point Q1 is laterally displaced by the amount e toward the point Q2. Using the point Q2 as a new reference point, the planting of the next character "e" is started.

When characters sufficient to make up one frame have been planted in the bit map memory 14 following the above described procedure, the data thus stored in the bit map memory is supplied via the interface 16 to the printing apparatus 17 to print out the desired characters.

It is pointed out that the pitch "e" in the bit section M of the bit map memory 14 can be so designed that the pitch is variable depending on individual characters. In such a case, the data which indicates the pitch "e" can suitably be stored in the character pattern control section T of the font ROM 13d.

As has been the case with the previously described font ROMs 13a and 13c, the font ROM 13d according to the present embodiment can also omit the character pattern control section T. Instead, the data p, q, r, s and/or the pitch data e, as well as the font address "G", may be stored in a code conversion table 12d as shown in Table 6.

TABLE 6

| Character Codes | G | p | q | r | s | e |
|---|---|---|---|---|---|---|
| 1 | G1 | p1 | q1 | r1 | s1 | e1 |
| 2 | G2 | p2 | q2 | r2 | s2 | e2 |
| 3 | G3 | p3 | q3 | r3 | s3 | e3 |
| — | — | — | — | — | — | — |
| m | Gm | pm | qm | rm | sm | em |
| — | — | — | — | — | — | — |
| n | Gn | pn | qn | rn | sn | en |

For example, when the character code signal specifying the "1" code is produced by the host computer 10 and is fed via the interface 11 to the code conversion table 12d, the font address "G1" and the data from p1 to e1 are read out in the table 12d. In the font ROM 13d, according to the read-out font address, the bit pattern of the character 37 A" is read-out in the storage region S corresponding to the font address "G1". And, in the bit map memory 14, based on the obtained data including p1 to e1, the bit pattern of the letter 37 A" is planted as shown in FIG. 13 and in the manner as explained hereinabove. The same procedure is followed with respect to the code signals indicating the "2" code and the "3" code and others.

According to the above described preferred embodiments of the invention, there is substantially no wasted blank area in the font memory which does not contain any character-bit, and, therefore, the utilization of the font memory is greatly improved. As for the scanning of the character-bit pattern when it is to be planted in the bit map memory, such scanning has to be done only over the portion equal to (p×r) bits. This results in a much higher processing speed.

It should be understood that, while the bit map memory is designed to store the character data sufficient to make up one frame according to the above described embodiments of the invention, it is well within the scope of the invention to design the bit map memory so that it may store character data enough to make up more than one frames.

What we claim is:

1. A method for producing character patterns for generation of selected characters on a character display having a plurality of character spaces for characters formed of a plurality of scan lines, said method utilizing a bit map memory having a plurality of character spaces, corresponding with character spaces of the character display, and front memory means having a plurality of storage regions, each including a character pattern storage section for storing a character pattern and a character pattern control data section for storing character pattern control data related to a character pattern stored in the associated character pattern storage section, the character pattern control data including a first portion identifying the number of scan lines before a predetermined scan line at which generation commences for the associated stored character, a second portion identifying the total number of scan lines for the associated stored character, and a third portion identifying the scan line length of the associated bit map memory character space, including the length of a scan line occupied by character bits when the character pattern is generated in said bit map memory and a predetermined additional length, said method comprising the steps of:

(a) storing in each of a plurality of selected character pattern storage sections a number of scan lines of one of a plurality of character patterns for characters to be generated, the number being equal to no more than the number of scan lines, counted in a direction perpendicular to the direction of scanning, required for scanning the stored character pattern, whereby each stored character pattern determines the length, in said direction perpendicular to the direction of scanning, of the character pattern storage section containing each said stored character pattern;

(b) storing in the character pattern control data section associated with each character pattern storage section character pattern control data related to the character pattern stored in the associated character pattern storage section;

(c) for a number of scan line equal to the number of scan lines stored in step (a) during storage of one of the selected character patterns, scanning the character pattern storage section storing the character pattern of said one of the selected characters to provide a character pattern to be displayed in a predetermined character space on the character display;

(d) substantially simultaneously with step (c), generating in the bit map memory character space corresponding with said predetermined character space a number of scan lines determined by the second portion of the character pattern control data related to the character to be displayed, with the generation commencing at a scan line of said bit map memory corresponding character space which scan line is determined by the first portion of said related character pattern control data and with each scan line continuing for a length determined by the third portion of said related character pattern control data; and (e) repeating steps (c) and (d) for each character displayed.

2. A method as claimed in claim 1, wherein said font memory means further has a code conversion table having therein the address for the storage region for each stored character pattern; said method further comprising the step of reading from said code conversion table the storage region address of said one of the selected characters.

3. A method as claimed in claim 1 wherein said font memory means further has a code conversion table having the address for the storage region for each stored character pattern and the character pattern control data section storing the character pattern control data for each stored character pattern; said method further comprising the step of reading from said code conversion table the storage region address and the character pattern control data of said one of said selected characters.

4. A method for producing character patterns for generation of selected characters on a character display having a plurality of character spaces for characters formed of a plurality of scan lines, said method utilizing a bit map memory having a plurality of character spaces, corresponding with character spaces of the character display, and font memory means having a plurality of storage regions, each storage region including a character bit pattern storage section for storing a character bit pattern, each character bit pattern storage section including a plurality of adjacent unit bit storage sections each having an identical predetermined bit capacity for storing at least a portion of the bits of the character pattern, each storage region further including a character pattern control data section for storing character pattern control data related to a character bit pattern stored in the associated character bit pattern storage section, the character pattern control data including a first portion identifying coordinates determining a character generation start location within a character space, a second portion identifying the maximum scan line length for the associated stored character, and a third portion identifying the total number of scan lines for the character pattern of the associated stored character, said method comprising the steps of:

(a) filling a first unit bit storage section of each of a plurality of selected character bit pattern storage sections with bits from an associated character bit pattern representative of a character until the first unit bit storage section is filled to its bit capacity, the filling proceeding in the direction parallel to the direction of scanning for the character bit pattern storage section;

(b) sequentially filling each of the adjacent unit bit storage sections of said selected character bit pattern storage sections with the sequential bits of sequential scan lines of the associated character bit pattern;

(c) storing in the character pattern control section associated with each character pattern storage section character pattern control data related to the character bit pattern stored in the associated character pattern storage section;

(d) scanning sequentially the unit bit storage sections of the character bit pattern storage section storing the character bit pattern of one of the selected characters to provide a character pattern to be displayed in a predetermined character space on the character display;

(e) substantially simultaneously with step (d), in the bit map memory character space corresponding with said predetermined character space, at a location determined by the first portion of the related character pattern control data, generating a first scan line for the character pattern stored in the scanned character bit pattern storage section, said first scan line having a scan line length determined by the second portion of the related character pattern control data;

(f) successively generating in said corresponding character space of the bit map memory subsequent scan lines for said character pattern until the total number of scan lines generated in said corresponding bit map memory character space is a number determined by the third portion of the related character pattern control data, with each scan line having a scan line length determined by said second portion of the related character pattern control data, thereby generating the character pattern of one of the selected characters; and (g) repeating steps (d), (e) and (f) for each character to be displayed.

5. A method as claimed in claim 4 wherein said font memory means further has a code conversion table having the address for the storage region for each stored character pattern; said method further comprising the step of reading from said code conversion table the storage region address of said one of the selected characters.

* * * * *